US008447891B2

(12) United States Patent
Brownlow et al.

(10) Patent No.: US 8,447,891 B2
(45) Date of Patent: May 21, 2013

(54) DYNAMICALLY ASSIGNING VIRTUAL FUNCTIONS TO CLIENT APPLICATIONS (75) Inventors: Sean T. Brownlow, Rochester, MN (US); Charles S. Graham, Rochester, MN (US); Kyle A. Lucke, Oronoco, MN (US); John R. Oberly, III, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/004,584

(22) Filed: Jan. 11, 2011

(65) Prior Publication Data
US 2012/0179844 A1 Jul. 12, 2012

(51) Int. Cl.
*G06F 3/00* (2006.01)
*G06F 5/00* (2006.01)

(52) U.S. Cl.
USPC .................. 710/14; 710/29; 710/58; 710/61

(58) Field of Classification Search
USPC ......................................... 710/14, 29, 58, 61
See application file for complete search history.

(56) References Cited

U.S. PATENT DOCUMENTS

| 7,979,592 | B1* | 7/2011 | Pettey et al. ...................... 710/3 |
| 8,103,810 | B2* | 1/2012 | Brown et al. ..................... 710/62 |
| 8,117,350 | B2* | 2/2012 | Watkins et al. .................... 710/9 |
| 8,244,775 | B1* | 8/2012 | Bak et al. ...................... 707/802 |
| 2002/0146004 | A1* | 10/2002 | Perkinson et al. ............ 370/389 |
| 2007/0109150 | A1 | 5/2007 | Gershfeld et al. |
| 2008/0147898 | A1* | 6/2008 | Freimuth et al. .................. 710/8 |
| 2009/0118839 | A1* | 5/2009 | Accapadi et al. ............... 700/28 |
| 2009/0144731 | A1 | 6/2009 | Brown et al. |
| 2009/0193166 | A1 | 7/2009 | Kropp et al. |
| 2009/0248937 | A1 | 10/2009 | Solomon et al. |
| 2009/0276773 | A1 | 11/2009 | Brown et al. |
| 2009/0313391 | A1 | 12/2009 | Watanabe |
| 2010/0014526 | A1 | 1/2010 | Chavan et al. |
| 2010/0082874 | A1* | 4/2010 | Baba et al. ..................... 710/316 |
| 2010/0095310 | A1 | 4/2010 | Oshins |
| 2010/0180266 | A1* | 7/2010 | Hiniker ......................... 717/140 |
| 2010/0180274 | A1* | 7/2010 | Cherian et al. .................... 718/1 |
| 2010/0205674 | A1* | 8/2010 | Zorn et al. ....................... 726/25 |
| 2011/0154318 | A1* | 6/2011 | Oshins et al. ..................... 718/1 |
| 2012/0102490 | A1 | 4/2012 | Eide et al. |
| 2012/0192178 | A1* | 7/2012 | Brownlow et al. ................ 718/1 |

OTHER PUBLICATIONS

U.S. Appl. No. 13/013,460, Non-Final Office Action dated Jun. 18, 2012, (8 pgs).

* cited by examiner

*Primary Examiner* — Idriss N Alrobaye
*Assistant Examiner* — Getente A Yimer
(74) *Attorney, Agent, or Firm* — Toler Law Group (57) ABSTRACT

A computer-implemented method may include determining a number of virtual functions that each port of a hardware input/output adapter is capable of supporting. The computer-implemented method may include assigning a first portion of internal resources of the hardware input/output adapter to each port of the hardware input/output adapter. The computer-implemented method may also include, for a particular port of the hardware input/output adapter, assigning a second portion of the internal resources to each virtual function that the particular port is capable of supporting. The second portion of the internal resources may be a subset of the first portion of the internal resources. The computer-implemented method may further include configuring a virtual function prior to a runtime to use the assigned second portion of the internal resources.

21 Claims, 8 Drawing Sheets

DYNAMICALLY ASSIGNING VIRTUAL FUNCTIONS TO CLIENT APPLICATIONS

FIELD OF THE DISCLOSURE

The present disclosure relates generally to computer systems, and more particularly, to managing virtualized functions that are hosted by a virtualized input/output (I/O) adapter.

BACKGROUND

A logically-partitioned computer system may use a virtualized hardware input/output (I/O) adapter to provide virtual functions to multiple logical partitions. During runtime, an application executing in a logical partition may request a virtual function. Internal resources at the virtualized hardware I/O adapter may be allocated, and the requested virtual function may be configured to use the allocated resources. Until the virtual function is available for use, the application may be unable to perform I/O operations. During runtime, delays resulting from allocating internal resources and configuring the virtual function may adversely affect I/O operations.

SUMMARY

In a particular embodiment, a computer-implemented method includes determining a number of virtual functions that each port of a hardware input/output adapter is capable of supporting. The computer-implemented method includes assigning a first portion of internal resources of the hardware input/output adapter to each port of the hardware input/output adapter. The computer-implemented method also includes, for a particular port of the hardware input/output adapter, assigning a second portion of the internal resources to each virtual function that the particular port is capable of supporting. The second portion of the internal resources is a subset of the first portion of the internal resources. The computer-implemented method further includes configuring a virtual function prior to a runtime to use the assigned second portion of the internal resources.

In another particular embodiment, an apparatus includes a processor and a memory to store program code. The program code is executable by the processor to determine a number of virtual functions that each port of a hardware input/output adapter is capable of supporting. The program code is executable by the processor to assign a first portion of internal resources of the hardware input/output adapter to each port of the hardware input/output adapter. The program code is further executable by the processor to assign a second portion of the internal resources to each virtual function at each port. The second portion of the internal resources is a subset of the first portion of the internal resources. The program code executable by the processor to configure a virtual function prior to a runtime to use the assigned second portion of the internal resources.

In another particular embodiment, a computer program product includes a non-transitory computer usable medium having computer usable program code embodied therewith. The computer usable program code is executable by a processor to determine a number of virtual functions that each port of a hardware input/output adapter is capable of supporting. The computer usable program code is executable by the processor to assign a first portion of internal resources of the hardware input/output adapter to each port of the hardware input/output adapter. The computer usable program code is further executable by the processor to assign a second portion of the internal resources to each virtual function at each port. The second portion of the internal resources is a subset of the first portion of the internal resources. The computer usable program code is also executable by the processor to configure a virtual function prior to a runtime to use the assigned second portion of the internal resources.

These and other advantages and features that characterize embodiments of the disclosure are set forth in the claims listed below. However, for a better understanding of the disclosure, and of the advantages and objectives attained through its use, reference should be made to the drawings and to the accompanying descriptive matter in which there are described exemplary embodiments of the disclosure.

DETAILED DESCRIPTION

In a virtualized computer system, a hardware input/output (I/O) adapter may be capable of providing virtual functions to multiple logical partitions. When a logical partition requests a virtual function during runtime, internal resources of the hardware I/O adapter may be allocated to the virtual function. The internal resources may include ingress queues, egress queues, operating modes (e.g., promiscuous mode and diagnostic mode), interrupt sources, other internal resources, or any combination thereof. The virtual function may be configured to use the allocated internal resources of the hardware I/O adapter. During runtime, the logical partition may delay performing I/O actions via the virtual function until the requested virtual function has been allocated and configured.

Delay may be reduced during runtime by allocating the internal resources and configuring the virtual functions prior to runtime, e.g., pre-allocating and pre-configuring the virtual functions before runtime. For example, the virtual functions may be allocated and configured during an initial program load (IPL) time period or during a firmware standby time period. The IPL time period may be a period of time during which a virtualized computer system is booting, i.e., loading drivers and software into main memory for execution. The firmware standby time period may be a time period after the virtualized computer system has completed booting and the hardware of the virtualized computer system has been configured, but before logical partitions have been created. During the firmware standby time period, a system administrator may use a hardware management console to enable a hardware I/O adapter to provide virtual functions. Virtual functions may be configured using internal resources of the hardware I/O adapter during a time period prior to runtime, such as during the firmware standby time period.

Figure 1:
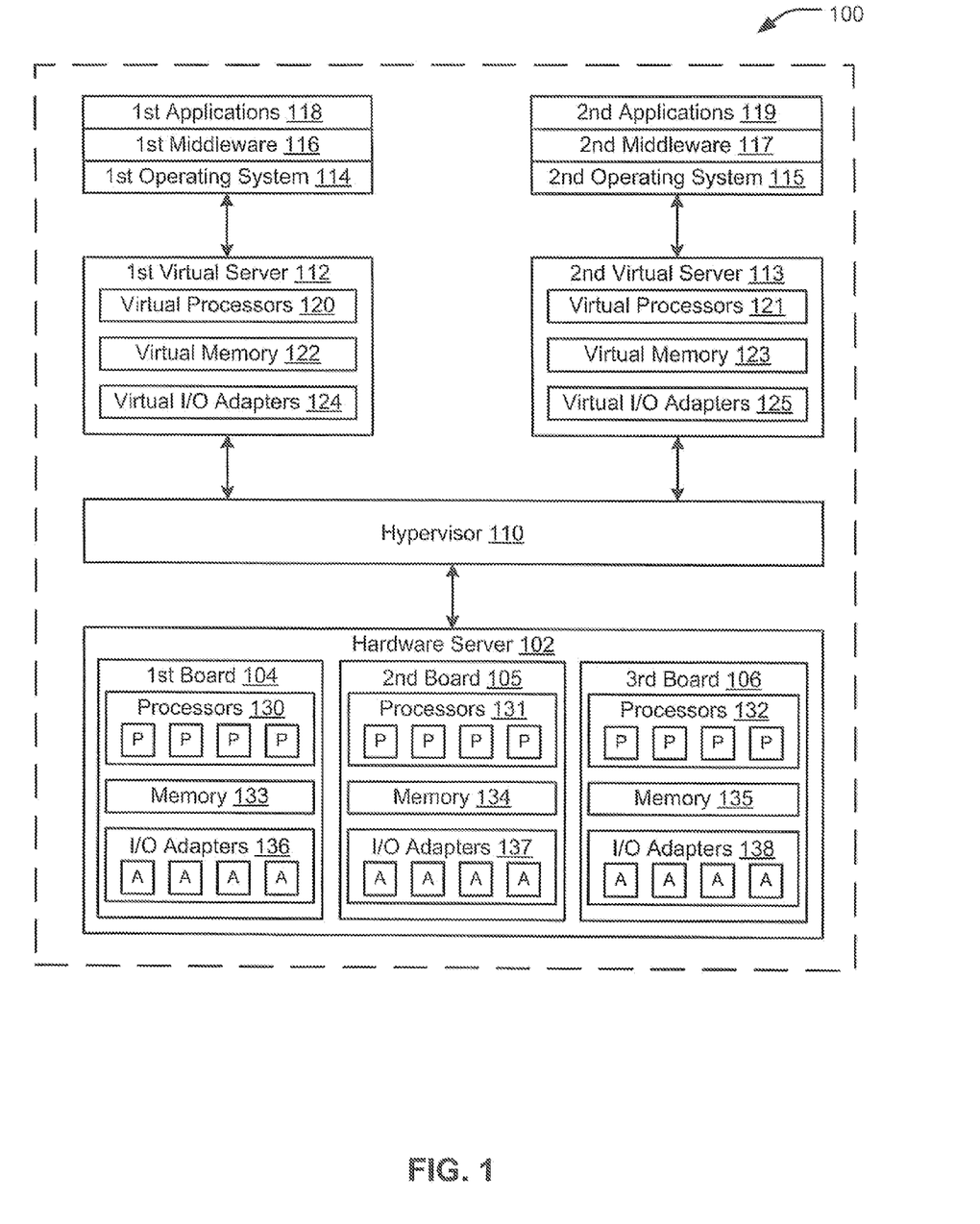
FIG. 1 is a block diagram of a first embodiment of a system to enable virtual functions to be dynamically assigned to client applications.

Referring to FIG. 1, a block diagram of a first embodiment of a system to enable virtual functions to be dynamically assigned to client applications is depicted and generally designated 100. The system 100 may include a hardware server 102 that is managed by a hypervisor 110. The hardware server 102 may include hardware resources, such as a first board 104, a second board 105, and a third board 106. While three boards are illustrated in FIG. 1, the number of boards may be increased or decreased based on processing considerations. The boards 104-106 may include processors 130-132, memory 133-135, and input/output (I/O) adapters 136-138. Each of the boards 104-106 may include additional hardware resources (not shown), such as specialized processors (e.g., digital signal processors, graphics processors, etc.), disk drivers, other types of hardware, or any combination thereof. The processors 130-132, the memory 133-135, and the I/O adapters 136-138 of the hardware server 102 may be managed by hypervisor 110. Each processor of the processors 130-132 may be a simultaneous multithreading (SMT)-capable processor that is capable of concurrently executing multiple different threads.

The hypervisor 110 may create and manage logical partitions, such as virtual servers 112, 113. A logical partition may be a subset of the resources of the hardware server 102 that is virtualized as a separate virtual server. Each of the virtual servers 112, 113 may have its own set of virtual resources, similar to a physical server. For example, the first virtual server 112 may include virtual processors 120, virtual memory 122, and virtual I/O adapters 124. Virtual server 113 may include virtual processors 121, virtual memory 123, and virtual I/O adapters 125. The hypervisor 110 may map the hardware of the hardware server 102 to the virtual servers 112, 113. For example, the processors 130-132 may be mapped to the virtual processors 120, 121; the memory 133-135 may be mapped to the virtual memory 122, 123, and the I/O adapters 136-138 may be mapped to the virtual I/O adapters 124-125. The hypervisor 110 may manage the selection of portions of the hardware server 102 and their temporary assignment to portions of the virtual servers 112, 113.

In the system 100, the hypervisor 110 may configure virtual functions, such as the virtual I/O adapters 124 and 125 during a time period that is prior to runtime (e.g., during a boot time period or during a firmware standby time period). During the runtime, the hypervisor 110 may assign the pre-configured virtual functions to the operating systems 114 and 115 to enable applications and middleware that are executing in the operating systems 114 and 115 to perform I/O operations.

Figure 2:
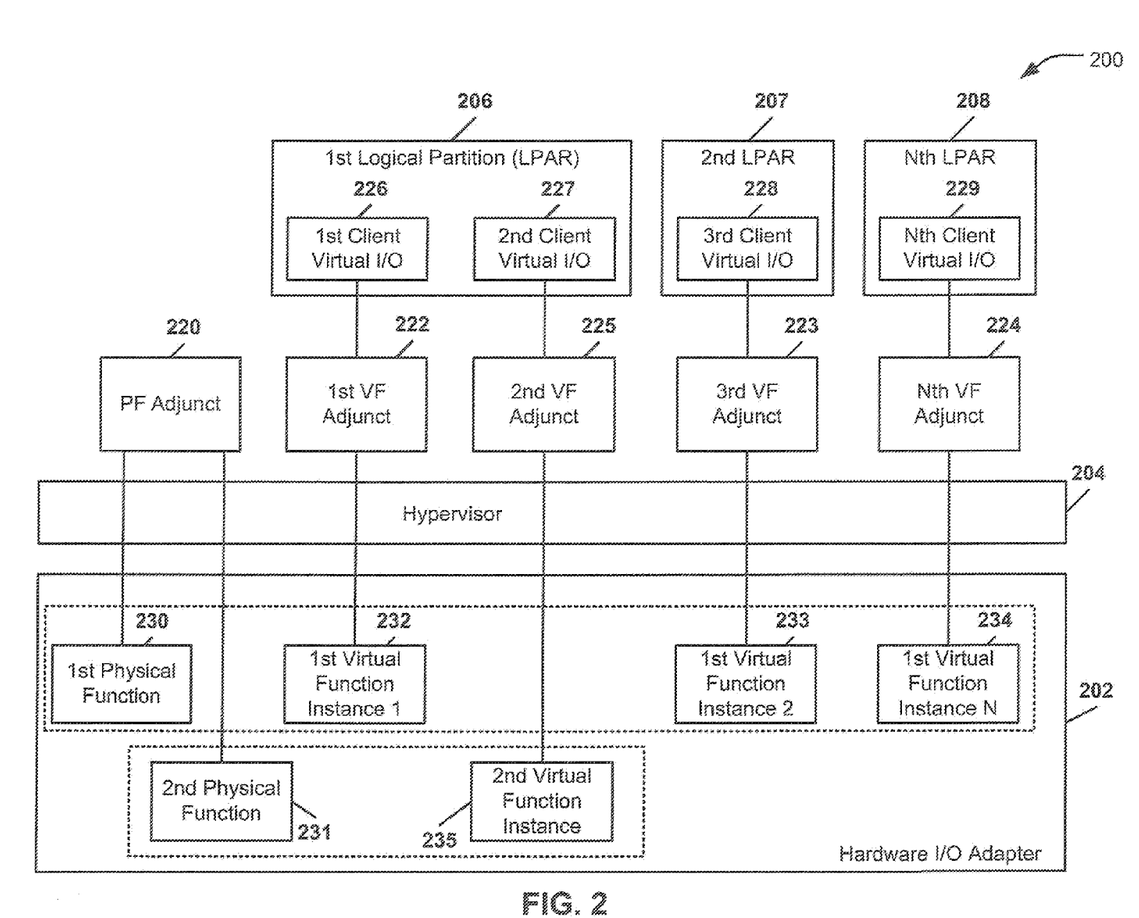
FIG. 2 is a block diagram of a second embodiment of a system to enable virtual functions to be dynamically assigned to client applications.

Referring to FIG. 2, a block diagram of a second embodiment of a system to enable virtual functions to be dynamically assigned to client applications is depicted and generally designated 200. In the system 200, a hypervisor 204 may enable multiple logical partitions to access virtual functions provided by hardware that includes a hardware I/O adapter 202. For example, the hypervisor 204 may enable a first logical partition 206, a second logical partition 207, and an Nth logical partition 208, to access virtual functions 232-235 that are provided by the hardware I/O adapter 202. To illustrate, the hypervisor 204 may use a first physical function 230 of the hardware I/O adapter 202 to provide a first instance of a first virtual function 232, a second instance of a first virtual function 233, and an Nth instance of a first virtual function 234 to the logical partitions 206-208. The hypervisor 204 may use a second physical function 231 of the hardware I/O adapter 202 to provide a second virtual function 235 to the logical partitions 206-208.

The physical functions 230, 231 may include peripheral component interconnect (PCI) functions that support single root I/O virtualization capabilities (SR-IOV). Each of the virtual functions 232-235 may be associated with one of the physical functions 230, 231 and may share one or more physical resources of the hardware I/O adapter 202.

Software modules, such as a physical function (PF) adjunct 220 and virtual function (VF) adjuncts 222-225, may assist the hypervisor in managing the physical functions 230, 231 and the virtual functions 232-235. For example, a user may specify a particular configuration and the PF manager 220 may configure the virtual functions 232-235 from the physical functions 230, 231 accordingly. The VF adjuncts 222-225 may function as virtual device drivers. For example, just as a device driver for a physical device may enable a client application to access the functions of the device, each of the VF adjuncts 222-225 may enable a client application to access the virtual functions 232-235. In the system 200, the VF adjuncts 222 and 224-225 may enable access to the first virtual function instances 232 and 234-235, and the second VF adjunct 225 may enable access to the second virtual function 235.

In operation, the PF manager 220 may enable the first virtual function instances 232-234 from the first physical function 230. The PF manager 220 may enable the second virtual function 235 from the second physical function 231. The virtual functions 232-235 may be enabled based on a user provided configuration. Each of the logical partitions 206-208 may execute an operating system (not shown) and client applications (not shown). The client applications that execute at the logical partitions 206-208 may perform virtual input/output operations. For example, a first client application executing at the first logical partition 206 may include first client virtual I/O 226, and a second client application executing at the first logical partition 206 may include a second client virtual I/O 227. The first client virtual I/O 226 may access the first instance of the first virtual function 232 via the first VF adjunct 222. The second client virtual I/O 227 may access the second virtual function 235 via the second VF adjunct 225. A third client virtual I/O 228 executing at the second logical partition 207 may access the second instance of the first virtual function 233 via the third VF adjunct 223. An Nth client virtual I/O 229 executing at the Nth logical partition 208 may access the Nth instance of the first virtual function 233 via the Nth VF adjunct 224.

Thus, the hypervisor 204 may enable the client virtual I/Os 226-229 to access the virtual functions 232-235 that are associated with the physical functions 230, 231 of the hardware I/O adapter 202. The virtual functions 232-235 of the hardware I/O adapter 202 may be configured prior to a runtime and dynamically assigned during runtime, as described below. For example, the hypervisor 204 may configure virtual functions 232-235 during a time period that is prior to runtime (e.g., during a boot time period or during a firmware standby time period). During the runtime, the hypervisor 204 may assign the pre-configured virtual functions 232-235 to the logical partitions 206-208 to enable client applications that are executing in the logical partitions 206-208 to perform I/O operations.

It will be appreciated by one skilled in the art that the present invention is equally suited to embodiments that do not utilize a virtual function (VF) manager and client virtual I/O to enable a logical partition to access a virtual function, and instead enable a device driver within a logical partition to directly manage the virtual function.

Figure 3:
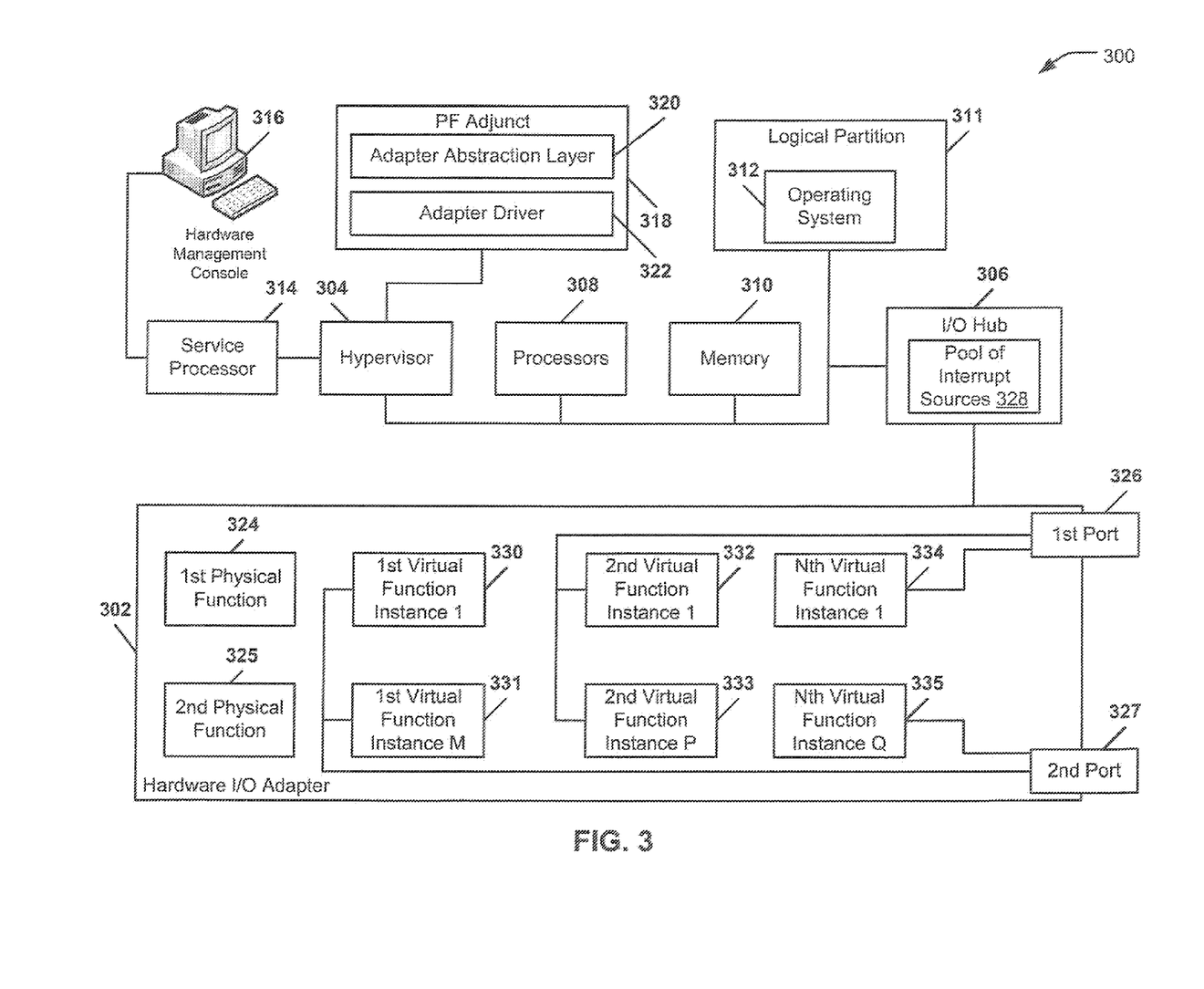
FIG. 3 is a block diagram of a third embodiment of a system to enable virtual functions to be dynamically assigned to client applications.

Referring to FIG. 3, a block diagram of a third embodiment of a system to enable virtual functions to be dynamically assigned to client applications is depicted and generally designated 300. In the system 300, a hypervisor 304 may be coupled to hardware devices, such as a hardware I/O adapter 302, an I/O hub 306, processors 308, and a memory 310. The hypervisor 304 may be coupled to a logical partition 311 that executes an operating system 312. The hypervisor 304 may enable the logical partition 311 to access virtual functions associated with the hardware I/O adapter 302. A physical function (PF) manager 318 may be coupled to the hypervisor 304 to manage the physical functions of the hardware I/O adapter 302. In a particular embodiment, the PF manager 318 may be in a logical partition. A hardware management console 316 may be coupled to the hypervisor 304 via a service processor 314.

The service processor 314 may be a microcontroller that is embedded in a hardware server (e.g., the hardware server 102 of FIG. 1) to enable remote monitoring and management of the hardware server via the hardware management console 316. For example, the hardware management console 316 may be used by a system administrator to specify a configuration of hardware devices, such as specifying virtual functions of the hardware I/O adapter 302. The PF manager 318 may configure virtual functions of the hardware I/O adapter 302 based on configuration information provided by a system administrator via the hardware management console 316.

The hypervisor 304 may enable hardware devices, such as the hardware I/O adapter 302, to be logically divided into virtual resources and accessed by one or more logical partitions (e.g., the N logical partitions 206-208 of FIG. 2). The I/O hub 306 may include a pool of interrupt sources 328. The hypervisor 304 may associate at least one interrupt source from the pool of interrupt sources 328 with each virtual function of the hardware I/O adapter 302.

The I/O hub 306 may be a hardware device (e.g., a microchip on a computer motherboard) that is under the control of the hypervisor 304. The I/O hub 306 may enable the hypervisor to control I/O devices, such as the hardware I/O adapter 302.

The processors 308 may include one more processors, such as central processing units (CPUs), digital signal processors (DSPs), other types of processors, or any combination thereof. One or more of the processors 308 may be configured in a symmetric multiprocessor (SMP) configuration.

The memory 310 may include various types of memory storage devices, such as random access memory (RAM) and disk storage devices. The memory 310 may be used to store and retrieve various types of data. For example, the memory 310 may be used to store and to retrieve operational instructions that are executable by one or more of the processors 308.

The operating system 312 may execute within the logical partition 311. The virtual I/O of client applications (e.g., the client virtual I/Os 226-229 of FIG. 2) that execute using the operating system 312 may access virtual functions of the hardware I/O adapter 302. The hypervisor 304 may use the I/O hub 306 to connect to and control I/O devices, such as the hardware I/O adapter 302.

The PF manager 318 may include an adapter abstraction layer 320 and an adapter driver 322. The adapter abstraction layer 320 may include a generic abstraction to enable configuration of physical functions and virtual functions of the hardware I/O adapter 302. The adapter driver 322 may be specific to each particular model of hardware adapter. The adapter driver 322 may be provided by a manufacturer of the hardware I/O adapter 302.

The hardware I/O adapter 302 may include physical functions and ports, such as a first physical function 324, a second physical function 325, a first port 326, and a second port 327. The PF manager 318 may configure virtual functions based on the physical functions 324, 325 and associate the virtual functions with one or more of the ports 326, 327 of the hardware I/O adapter 302. For example, the PF manager 318 may configure the first physical function 324 to host multiple instances of a first virtual function, such as the first instance of the first virtual function 330 and the Mth instance of the first virtual function 331, where M is greater than 1. The instances of the first virtual function 330, 331 may be associated with the second port 327. The PF manager 318 may configure the second physical function 325 to host multiple instances of a second virtual function, such as the first instance of the second virtual function 332 and the Pth instance of the second virtual function 333, where P is greater than 1. The instances of the second virtual function 332, 333 may be associated with the first port 326. The PF manager 318 may configure multiple instances of an Nth virtual function, such as the first instance of the Nth virtual function 334 and the Qth instance of the Nth virtual function 335, where N is greater than 2, and Q is greater than 1. The instances of the Nth virtual function 334, 335 may be associated with the second port 327. The instances of the Nth virtual function 334, 335 may be hosted by a physical function, such as one of the first physical function 324, the second physical function 325, and another physical function (not shown).

The hypervisor 304 may thus enable access to the virtual functions 330-335 that are associated with the physical functions 324, 325 of the hardware I/O adapter 302. The virtual functions 330-335 of the hardware I/O adapter 302 may be configured prior to a runtime and dynamically assigned during runtime, as described below. For example, the hypervisor 304 may configure the virtual functions 330-335 during a time period that is prior to runtime (e.g., during a boot time period or during a firmware standby time period). During the runtime, the hypervisor 304 may assign the pre-configured virtual functions 330-335 to a logical partition (e.g., the local partition 311) to enable client applications that are executing in the logical partition to perform I/O operations.

Figure 4:
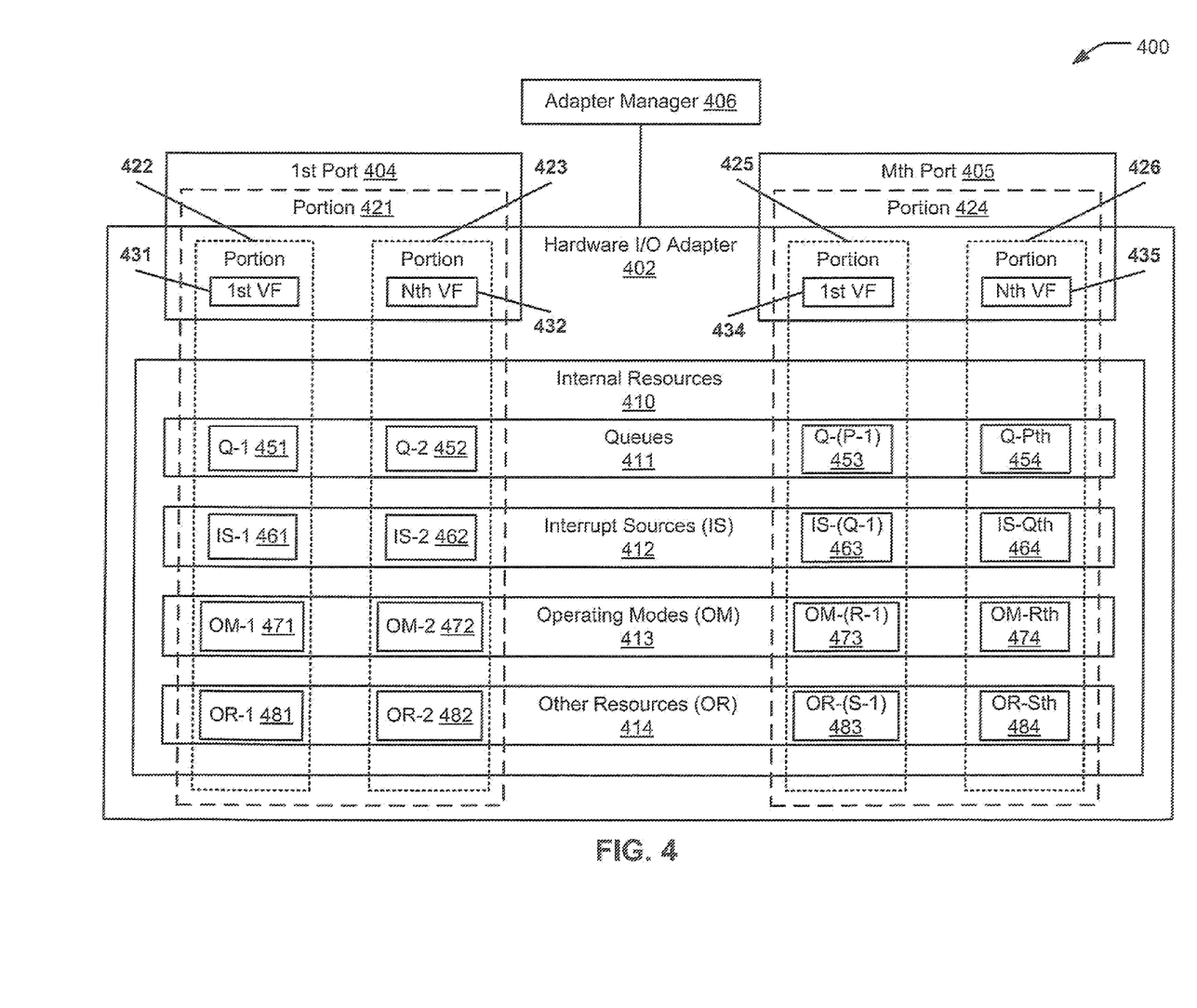
FIG. 4 is a block diagram of a fourth embodiment of a system to enable virtual functions to be dynamically assigned to client applications.

Referring to FIG. 4, a block diagram of a fourth embodiment of a system to enable virtual functions to be dynamically assigned to client applications is depicted and generally designated 400. The system 400 includes a hardware input/output (I/O) adapter 402 managed by an adapter manager 406.

The adapter manager 406 may be a hypervisor (e.g., one of the hypervisor 110 of FIG. 1, the hypervisor 204 of FIG. 2, and the hypervisor 304 of FIG. 3), an adjunct to the hypervisor (e.g., one of the PF adjunct 220 of FIG. 2, the VF adjuncts 222-224 of FIG. 2, and the PF adjunct 318 of FIG. 3), or a combination of both. The adapter manager 406 may configure virtual functions that are hosted by the hardware I/O adapter 402.

The hardware I/O adapter 402 may include various resources, such as ports, queues, and operating modes. For example, in FIG. 4, the hardware I/O adapter 402 includes M ports (e.g., where M is greater than 1), such as a first port 404 and an Mth port 405, and internal resources 410. The ports 404 and 405 may be physical ports that are capable of performing I/O operations with external devices.

The internal resources 410 may include one or more queues 411, one or more interrupt sources 412, one or more operating modes 413, one or more other resources 414, or any combination thereof. The queues 411 may include different types of queues, such as ingress queues and egress queues. The queues 411 may include P queues (e.g., where P is greater than 1), such as a first queue 451, a second queue 452, a P−1 queue 453, and a Pth queue 454. The interrupt sources 412 may include Q interrupts sources (e.g., where Q is greater than 1), such as a first interrupt source 461, a second interrupt source 462, a Q−1 interrupt source 463, and a Qth interrupt source 464. The operating modes 416 may include a promiscuous mode, a diagnostic mode, another type of operating mode, or any combination thereof. The operating mode 413 may include R operating modes (e.g., where R is greater than 1), such as a first operating mode 471, a second operating mode 472, an R−1 operating mode 473, and an Rth operating mode 474. The other resources 414 may include S other resources (e.g., where S is greater than 1), such as a first other resource 481, a second other resource 482, an S−1 other resources 483, and an Sth other resource 484.

In operation, prior to a run time, the adapter manager 406 may determine a number of internal resources 410 associated with the hardware I/O adapter 402. For example, prior to a run time, the adapter manager 406 may determine a maximum number of internal resources 410 that are associated with the hardware I/O adapter 402. The adapter manager 406 may determine a number of ports (e.g., the M number of ports 404 and 405) of the hardware I/O adapter 402. The adapter manager 406 may divide the internal resources 410 among the ports of the hardware I/O adapter 402. In a particular embodiment, the adapter manager 406 may divide the internal resources 410 equally among the M ports of the hardware I/O adapter 402. For example, if there are sixteen queues and two ports, the adapter manager 406 may assign eight queues to each port. In another particular embodiment, the adapter manager 406 may divide the internal resources 410 unequally among the M ports of the hardware I/O adapter 402. For example, some ports may get more of the internal resources 410 than other ports of the hardware I/O adapter 402.

Prior to the runtime, the adapter manager 406 may assign a portion 421 of the internal resources 410 for virtual functions that are capable of utilizing the first port 404. The adapter manager 406 may allocate an Mth portion 424 of the internal resources 410 and assign the Mth portion 424 to virtual functions that are capable of utilizing the Mth port 405. The adapter manager 406 may further subdivide the portions 421 and 424 of the internal resources 410 that are assigned to each of the ports 404-405 for each virtual function that is capable of utilizing a particular port. For example, the adapter manager 406 may assign a portion 422 of the portion 421 to a first virtual function 431. The portion 422 may be a subset of the portion 421 of the internal resources 410. The adapter manager 406 may assign a portion 423 of the portion 421 to an Nth virtual function 432. The portion 423 may be a subset of the portion 421 of the internal resources 410.

Prior to the runtime, the adapter manager 406 may assign subdivide the portion 424 among virtual functions that are capable of utilizing the Mth port 405. For example, the adapter manager 406 may assign a portion 425 of the portion 424 that is assigned to the Mth port 405 to a first virtual function 434. The adapter manager 406 may allocate a portion 426 and assign the sixth portion 426 to an Nth virtual function 435. In FIG. 4, the ports 404-405 are depicted as having an equal number of virtual functions associated with each of the ports 404-405. In a particular embodiment, each port of the hardware I/O adapter 402 may have a different number of virtual functions associated with each port of the hardware I/O adapter 402.

The adapter manager 406 may configure the virtual functions 431-435 to perform I/O operations using the portions of the internal resources 410 that are assigned to each of the virtual functions 431-435. For example, the adapter manager 406 may configure the first virtual function 431 of the first port 404 using the portion 422 of the internal resources 410. The adapter manager 406 may configure the Nth virtual function 432 of the first port 404 using the portion 423 of the internal resources 410. The adapter manager 406 may configure the first virtual function 434 of the Mth port 405 using the portion 425 of the internal resources 410. The adapter manager 406 may configure the Nth virtual function 435 of the second port 405 using the portion 426 of the internal resources 410.

Thus, prior to the runtime, an adapter manager 406 may assign the portions 421 and 424 of the internal resources 410 to the ports 404 and 405, respectively. The adapter manager 406 may subdivide the portion 421 among the virtual functions 431 and 432 that are capable of utilizing the port 404. The adapter manager 406 may subdivide the portion 424 among the virtual functions 434 and 435 that are capable of utilizing the port 405. The adapter manager 406 may thus pre-allocate the internal resources 410 and configure a number of virtual functions that the hardware I/O adapter 402 is capable of supporting prior to the runtime. By configuring the virtual functions 431-435 prior to the runtime, the adapter manager 406 may enable rapid and dynamic assignment of the virtual functions during the runtime. A runtime delay resulting from assigning a pre-configured virtual function to a logical partition may be reduced as compared to allocating internal resources and configuring a virtual function during the runtime.

Figure 5:
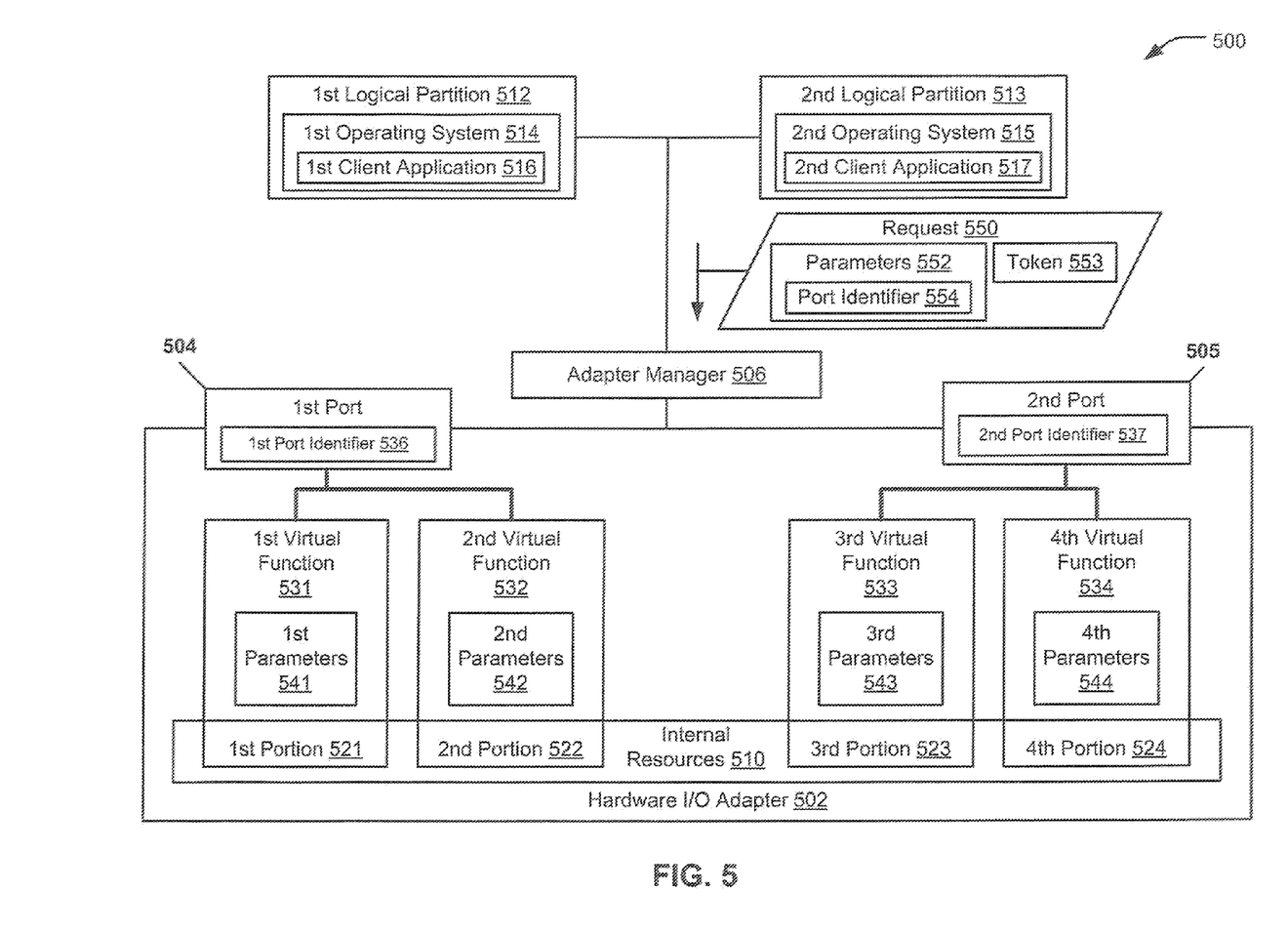
FIG. 5 is a block diagram of a fifth embodiment of a system to enable virtual functions to be dynamically assigned to client applications.

Referring to FIG. 5, a block diagram of a fifth embodiment of a system to enable virtual functions to be dynamically assigned to client applications is depicted and generally designated 500. In the system 500, an adapter manager 506 may respond to a request from a logical partition, such as one of logical partitions 512 and 513, to provide a virtual function that is hosted by a hardware input/output (I/O) adapter 502. The adapter manager 506 may be a hypervisor (e.g., one of the hypervisor 110 of FIG. 1, the hypervisor 204 of FIG. 2, and the hypervisor 304 of FIG. 3), an adjunct to the hypervisor (e.g., one of the PF adjunct 220 of FIG. 2, the VF adjuncts 222-224 of FIG. 2, and the PF adjunct 318 of FIG. 3), or a combination of both.

An operating system and one or more client applications may execute in each of the logical partitions 512 and 513. For example, in FIG. 5, the first logical partition 512 may execute a first operating system 514 and a first client application 516. The second logical partition 513 may execute a second operating system 515 and a second client application 517.

The hardware I/O adapter 502 may be a virtual I/O adapter that is capable of providing virtual functions, such as a single root I/O virtualization adapter (SR-IOV). The hardware I/O adapter 502 may include internal resources 510, such as egress queues, ingress queues, interrupt sources, operating modes, other internal resources associated with the hardware I/O adapter 502, or any combination thereof. The hardware I/O adapter 502 may include a particular number of ports, such as a first port 504 and a second port 505. Each of the ports 504 and 505 may have a unique identifier. For example, the first port 504 may have a first port identifier 536. The second port 505 may have a second port identifier 537.

The hardware I/O adapter 502 may be capable of hosting multiple virtual functions, such as a first virtual function 531, a second virtual function 532, a third virtual function 533 and a fourth virtual function 534. One or more parameters may be associated with each of the virtual functions 531-534. For example, first parameters 541 may be associated with first virtual function 531, second parameters 542 may be associated with the second virtual function 532, third parameters 543 may be associated with the third virtual function 533, and fourth parameters 544 may be associated with the fourth virtual function 534. The parameters 541-544 may include one or more parameters associated with a virtual function, such as which of the ports 504 and 505 a particular virtual function is capable of accessing. In FIG. 5, the virtual functions 531-532 may be capable of accessing the first port 504 and the virtual functions 533-534 may be capable of accessing the second port 505.

In operation, prior to a runtime, the adapter manager 506 may divide and allocate the internal resources 510 among the virtual functions 531-534 that the hardware I/O adapter 502 is capable of hosting. For example, the adapter manager 506 may subdivide a first portion 521 of the internal resources 510 to the first virtual function 531. The adapter manager 506 may allocate a second portion 522 of the internal resources 510 to the second virtual function 532. The adapter manager 506 may allocate a third portion 523 of the internal resources 510 to the third virtual function 533. The adapter manager 506 may allocate a fourth portion 524 of the internal resources 510 to the fourth virtual function 534.

The adapter manager 506 may configure each of the virtual functions that the hardware I/O adapter 502 is capable of hosting. For example, the adapter manager 506 may configure the first virtual function 531 to use the first portion 521 of the internal resources 510. The adapter manager 506 may configure the second virtual function 532 to use the second portion 522 of the internal resources 510. The adapter manager 506 may configure the third virtual function 533 to use the third portion 523 of the internal resources 510. The adapter manager 506 may configure the fourth virtual function 534 to use the fourth portion 524 of the internal resources 510. Thus, prior to the runtime, the adapter manager 506 may pre-configure the virtual functions 531-534 that the hardware I/O adapter 502 is capable of hosting.

During the runtime, the adapter manager 506 may receive a request 550 from a logical partition (e.g., one of the logical partitions 512 and 513) to provide a virtual function. The request 550 may include parameters 552 and a token 553. The parameters 552 may identify parameters of the requested virtual function. For example, the parameters 552 may include a port identifier 554. To illustrate, the first logical partition 512 may send the request 550 requesting a virtual network interface card (VNIC) that is capable of accessing the first port 504. As another example, the second logical partition 513 may send the request 550 requesting an Ethernet virtual function that is capable of accessing the second port 505.

In response to receiving the request 550, the adapter manager 506 may select one of the virtual functions 531-534 that is not currently assigned to a particular logical partition. The adapter manager 506 may determine whether the selected virtual function has parameters that closely match (e.g., correspond to) the parameters 552 of the request 550. For example, the adapter manager 506 may determine whether the parameters 552 of the request 550 correspond to one of the parameters 541-544 of the virtual functions 531-534. In the context of the parameters 541-544, the terms "closely match" and "correspond to" indicate that the requested parameters 552 may be a minimum set of parameters. For example, the requested parameters 552 may specify a minimum bandwidth or a minimum quality of service parameter of the requested virtual function. The adapter manager 506 may determine whether one of the parameters 541-544 meets or exceeds the requested parameters 552.

The adapter manager 506 may determine whether the parameters 552 of the request 550 closely match (e.g., correspond to) the parameters 541-544 of one of the available (e.g., unassigned) virtual functions 541-544. The adapter manager 506 may associate one of the available virtual functions 531-534 with the token 553. The token 553 may enable the logical partition that sent the request 550 to access the virtual function.

The request 550 may request a virtual function that is capable of accessing a particular port by specifying a port identifier 554 of the particular port in the request 550. For example, the port identifier 554 may correspond to the second port identifier 537, indicating that the request 550 is requesting one of the virtual functions 533 and 534 that are capable of accessing the second port 505.

Thus, prior to the runtime, the adapter manager 506 may allocate the internal resources 510 of the hardware I/O adapter 502 to the virtual functions 531-534 and configure the virtual functions 531-534. During the runtime, the adapter manager 506 may respond to the request 550 by determining which of the parameters 541-544 of the virtual functions 531-534 correspond to the requested parameters 552. If one of the parameters 541-544 corresponds to the requested parameters 552, the adapter manager 506 may associate one of the virtual functions 531-534 with the token 553. By pre-configuring the virtual functions 531-534 prior to the runtime, the adapter manager 506 can respond to requests (e.g., the request 550) by finding an unassigned pre-configured virtual function that has parameters that correspond to the requested parameters and associating the virtual function with the token 553. Providing a virtual function during the runtime by selecting from a pool of pre-configured virtual functions may reduce a time to provide the virtual function as compared to configuring the requested virtual function during the runtime.

Figure 6:
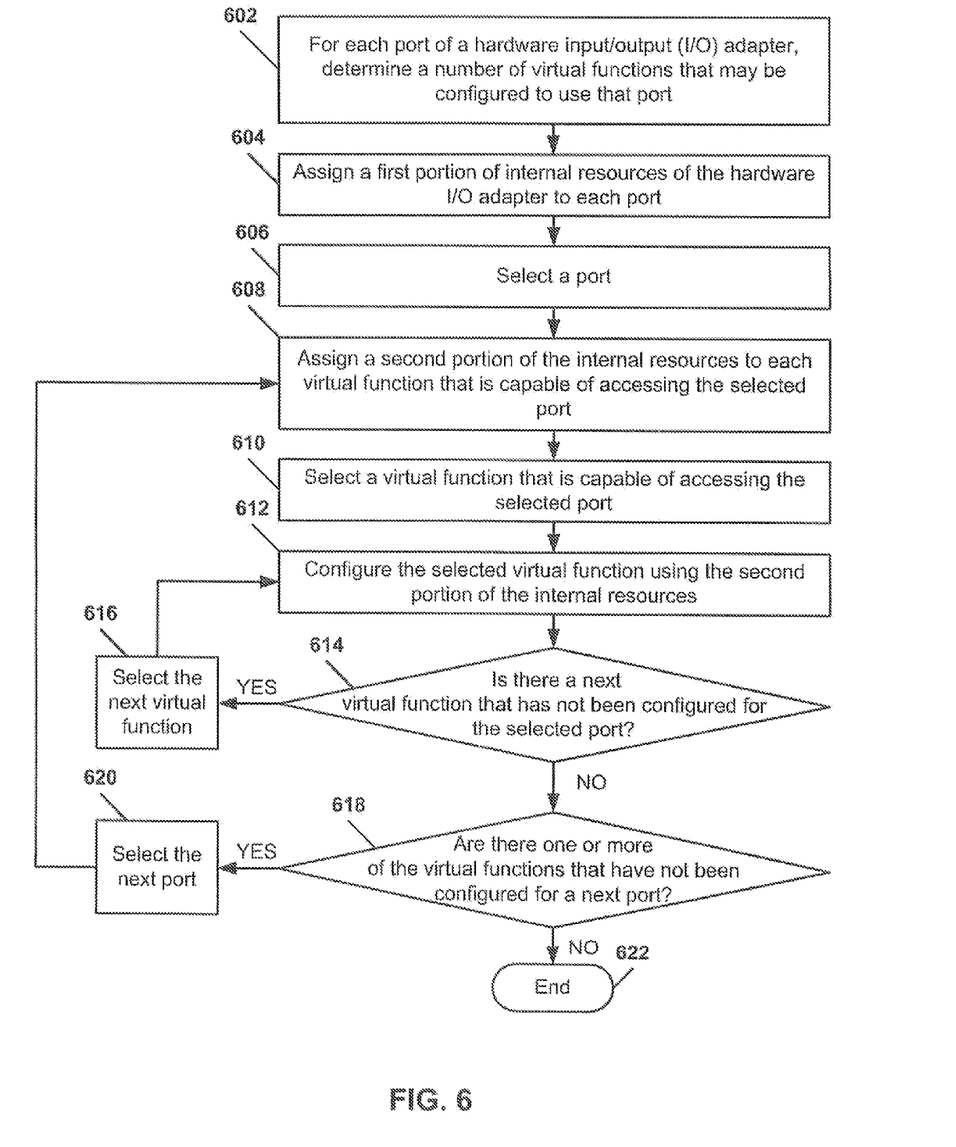
FIG. 6 is a flow diagram of a first method to enable virtual functions to be dynamically assigned to client applications.

Referring to FIG. 6, a flow diagram of a first method to enable virtual functions to be dynamically assigned to client applications is depicted. The method of FIG. 6 may be performed by an adapter manager, such as the adapter manager 406 of FIG. 4 and the adapter manager 506 of FIG. 5. In a particular embodiment, the method of FIG. 6 may be performed prior to runtime, such as during a boot time period or during a firmware standby time period.

For each port of a hardware input/output (I/O) adapter, a number of virtual functions that may be configured to use that port may be determined at 602. For example, the adapter manager 406 of FIG. 4 may determine a maximum number of virtual functions that each of the ports 404-405 is capable of supporting. Moving to 604, a first portion of internal resources of the hardware I/O adapter may be assigned to each port. Advancing to 606, a port may be selected. Proceeding to 608, a second portion of the internal resources may be assigned to each virtual function that is capable of accessing the selected port. The second portion may be a subset of the first portion of the internal resources, e.g., the portion of the internal resources that are assigned to each port may be further subdivided among the virtual functions that are capable of accessing each port. For example, in FIG. 4, each virtual function that is supported by the first port 504 may be assigned a portion of the first portion 421 of the internal resources 410.

Moving to 610, a virtual function that is capable of accessing the selected port is selected. Continuing to 612, the selected virtual function may be configured using the second portion of the internal resources. For example, the first virtual function 431 of FIG. 4 may be configured to use the portion 422 of the internal resources 410. Proceeding to 614, a determination is made whether there is a next virtual function that has not been configured for the selected port. If a determination is made, at 614, that there is a next virtual function that has not been configured for the selected port, the method proceeds to 616, where the next virtual function is selected and the next virtual function is configured at 612.

If a determination is made at 614 that all the virtual functions for the selected port have been configured, the method proceeds to 618. At 618, a determination is made whether there are one or more of the virtual functions that have not been configured for a next port. When the determination is made at 618 that there are no more virtual functions to configure at a next port, the method ends at 622. When the determination is made at 618 that at least one virtual function of a next port has not been configured, the method proceeds to 620 where the next port is selected and the virtual functions of the next port are allocated among the virtual functions that are capable of accessing the next port at 608.

For example, the adapter manager 406 of FIG. 4 may divide the internal resources 410 and assign the portion 421 to the first port 404 and may assign the portion 424 to the Mth port 405. The adapter manager 406 may select the first port 404 and may subdivide the portion 421 among the virtual functions (e.g., the virtual functions 431 and 432) that are capable of accessing the first port 404. For example, the adapter manager 406 may assign the portion 422 to the first virtual function 431 and may assign the portion 423 to the Nth virtual function 432. In a particular embodiment, the portion 421 may be distributed evenly among the N virtual functions 431 and 432 that are capable of accessing the first port 404. Thus, the adapter manager 406 may configure the N virtual functions 431 and 432 that are capable of accessing the first port 404. The adapter manager 406 may repeat this process for each port of the hardware I/O adapter 402. To illustrate, the adapter manager 406 may select the second port 405 and subdivide the portion 424 among the virtual functions (e.g., the virtual functions 434 and 435) that are capable of accessing the Mth port 405. The adapter manager 406 may assign the portion 425 to the first virtual function 434 of the Mth port 405 and assign the portion 426 to the Nth virtual function 435 of the Mth port 405.

Prior to a runtime, internal resources of a hardware I/O adapter may be divided among the ports of the hardware I/O adapter. A portion of the internal resources that is assigned to a particular port of the hardware I/O adapter may be subdivided among virtual functions that are capable of accessing the particular port. The virtual functions may be configured to use the subdivided portion of the internal resources. By configuring the virtual functions of the hardware I/O adapter prior to the runtime, the pre-configured virtual functions may be quickly provided to logical partitions during the runtime.

Figure 7:
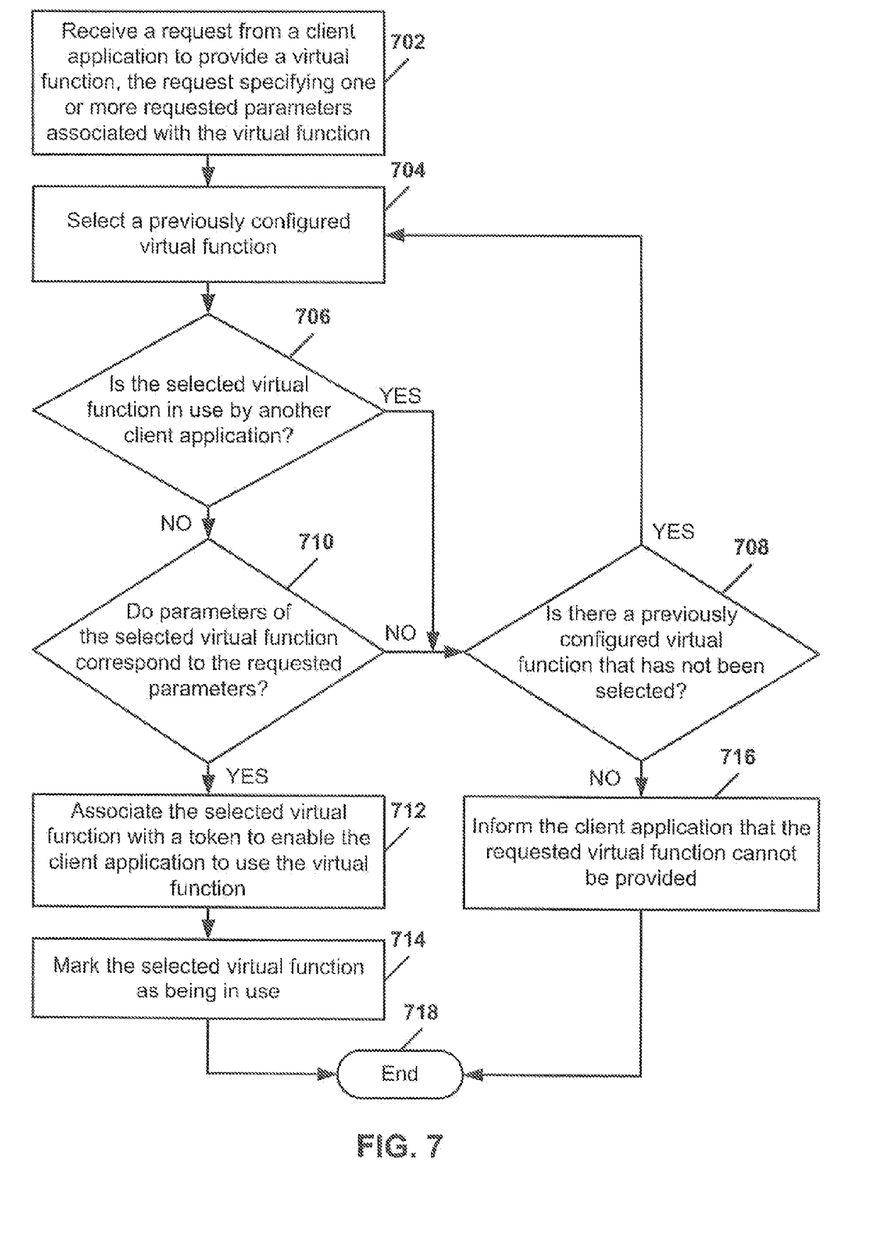
FIG. 7 is a flow diagram of a second method to to enable virtual functions to be dynamically assigned to client applications.

Referring to FIG. 7, a flow diagram of a second method to enable virtual functions to be dynamically assigned to client applications is depicted. The method of FIG. 7 may be performed by an adapter manager, such as the adapter manager 406 of FIG. 4 and the adapter manager 506 of FIG. 5. In a particular embodiment, the method of FIG. 7 may be performed during runtime, such as after logical partitions have been created.

A request may be received from a client application to provide a virtual function at 702. The request may specify one or more requested parameters that are associated with the virtual function that is being requested. For example, the request 550 of FIG. 5 may specify the parameters 552, such as the port identifier 554, associated with the requested virtual function.

Moving to 704, a previously configured virtual function may be selected. Advancing to 706, a determination may be made whether the selected virtual function is in use by another client application. When it is determined at 706 that the selected virtual function is in use by another client application, the method may proceed to 708 to determine whether there is a previously configured virtual function that has not been selected. In a particular embodiment, 704 and 706 may be combined. For example, when a request is received, a virtual function may be selected from a pool of unassigned, previously configured virtual functions. After the virtual function is assigned to a particular logical partition, the virtual function may be marked as in use or moved to a pool of in-use virtual functions.

When the determination is made at 706 that the selected virtual function is not in use by another client application, the method proceeds to 710. A determination is made whether the parameters of the selected virtual functions correspond to the requested parameters at 710. For example, if the port identifier of the selected virtual function does not correspond to the requested port identifier, then the parameters of the selected virtual function may not correspond to the requested parameters. In response to determining at 710 that the parameters of the selected virtual functions do not correspond to the requested parameters, the method may proceed to 708 to determine whether there is a previously configured virtual function that has not been selected. If the determination is made at 708 that there is another preconfigured virtual function that has not been selected, the method proceeds to 704 where another previously configured virtual function is selected. If the determination is made at 708 that there are no more preconfigured virtual function to select (e.g., all the previously configured virtual functions in the pool have been selected), the method proceeds to 716 where the client application may be informed that the requested virtual functions cannot be provided and the method ends at 718.

When a determination is made at 710 that the parameters of the selected virtual function correspond to the requested parameters, the method proceeds to 712. The selected virtual function may be associated with the token provided by the client application at 712 to enable the client application to use the virtual function. In a particular embodiment, a PF adjunct (e.g., the PF adjunct 220 of FIG. 2 and the PF adjunct 318 of FIG. 3) may instruct a hypervisor (e.g., the hypervisor 204 of FIG. 2 and the hypervisor 304 of FIG. 3) to associate the selected virtual function with the token. The selected virtual function may be marked as being in use at 714 and the method may end at 718.

Thus, if a request to provide a virtual function with particular parameters is received during the runtime, then a previously configured virtual function may be provided when the parameters of the previously configured virtual function correspond to the requested parameters. Providing a previously configured virtual function during the runtime may reduce or eliminate a delay caused by configuring a virtual function during the runtime.

Figure 8:
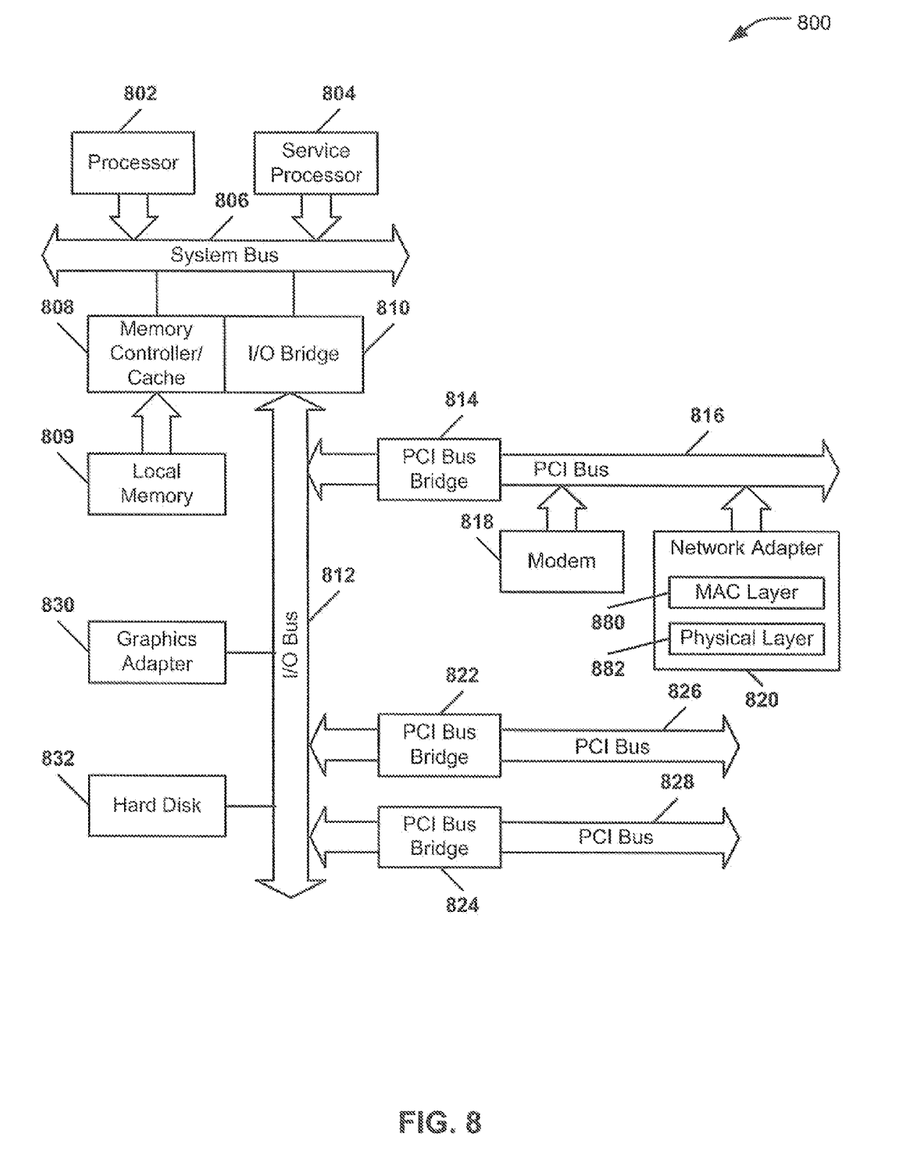
FIG. 8 is a block diagram of an illustrative embodiment of a general computer system.

Referring to FIG. 8, a block diagram of an illustrative embodiment of a general computer system is depicted and generally designated 800. The data processing system 800 may be a symmetric multiprocessor (SMP) system that includes a plurality of shared processors or SMT-capable processors, such as processors 802 and 804 connected to system bus 806. Alternatively, a single processor system may be employed. In the depicted example, processor 804 may be a service processor. Each SMT-capable processor may be capable of concurrently executing multiple hardware threads on the one processor.

Connected to system bus 806 may be memory controller/cache 808, which provides an interface to local memory 809. An I/O bus bridge 810 may be connected to a system bus 806 to provide an interface to I/O bus 812. A memory controller/cache 808 and an I/O bus bridge 810 may be integrated as depicted.

A peripheral component interconnect (PCI) bus bridge 814 connected to I/O bus 812 may provide an interface to PCI local bus 816. In FIG. 8, the term PCI in this application may also refer to variations and extensions of PCI, such as PCI express (PCIe). Multiple modems may be connected to PCI bus 816. Typical PCI bus implementations may support PCI expansion slots or add-in connectors. Communications links to network computers may be provided via modem 818 and network adapter 820 connected to PCI local bus 816 through add-in boards.

Network adapter 820 may include a physical layer 882 which enables analog signals to go out to a network, such as for example, an Ethernet network via an R45 connector. A media access controller (MAC) 880 may be included within network adapter 820. Media access controller (MAC) 880 may be coupled to bus 816 and processes digital network signals. MAC 880 may serve as an interface between bus 816 and physical layer 882. MAC 880 may perform a number of functions involved in the transmission and reception of data packets. For example, during the transmission of data, MAC 880 may assemble the data to be transmitted into a packet that includes address and error detection fields. During the reception of a packet, MAC 880 may disassemble the packet and perform address checking and error detection. In addition, MAC 880 may perform encoding/decoding of digital signals prior to transmission, perform preamble generation/removal, and bit transmission/reception.

Additional PCI bus bridges 822 and 824 may provide interfaces for additional PCI buses 826 and 828, from which additional modems or network adapters may be supported. In this manner, data processing system 800 may allow connections to multiple network computers. A memory-mapped graphics adapter 830 and hard disk 832 may be directly or indirectly connected to I/O bus 812.

Service processor 804 may interrogate system processors, memory components, and I/O bridges to generate and inventory the system 800. Service processor 804 may execute Built-In-Self-Tests (BISTs), Basic Assurance Tests (BATs), and memory tests on one or more of the elements in the system 800. Any error information for failures detected during the BISTs, BATs, and memory tests may be gathered and reported by service processor 804.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments, including embodiments of I/O adapters virtualized in multi-root input/output virtualization (MR-IOV) embodiments, or virtualized using software virtualization intermediaries, will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A computer-implemented method, comprising:
    determining prior to a runtime a number of virtual functions that each port of a hardware input/output adapter is capable of supporting;
    assigning prior to the runtime a first portion of internal resources of the hardware input/output adapter to each port of the hardware input/output adapter;
    for a particular port of the hardware input/output adapter, assigning prior to the runtime a second portion of the internal resources to each virtual function that the particular port of the hardware input/output adapter is capable of supporting, the second portion of the internal resources a subset of the first portion of the internal resources;
    configuring a first virtual function prior to the runtime to use the assigned second portion of the internal resources to enable the first virtual function to be assigned during runtime;

receiving a request to provide a particular virtual function, the request specifying one or more requested parameters associated with the particular virtual function;

selecting during the runtime the first virtual function that was configured prior to the runtime;

determining during the runtime whether parameters of the selected virtual function correspond to the requested parameters; and assigning during the runtime the selected virtual function to a client application in response to determining that the parameters of the selected virtual function correspond to the requested parameters, wherein assigning during the runtime the selected virtual function to the client application comprises associating the selected virtual function with a token that is provided by the client application.

2. The computer-implemented method of claim 1, further comprising:

dividing prior to the runtime the internal resources of the hardware input/output adapter into approximately equal portions; and assigning prior to the runtime each of the approximately equal portions of the internal resources to each port of the hardware input/output adapter.

3. The computer-implemented method of claim 1, wherein the internal resources of the hardware input/output adapter include one or more of a plurality of ingress queues, a plurality of egress queues, a plurality of interrupt sources, and a plurality of operating modes.

4. The computer-implemented method of claim 1, wherein configuring the first virtual function prior to the runtime comprises:

allocating the first virtual function at the hardware input/output adapter; and configuring the first virtual function during an initial program load.

5. The computer-implemented method of claim 1, further comprising configuring at least one additional virtual function prior to the runtime.

6. The computer-implemented method of claim 1, wherein the requested parameters include a port identifier.

7. The computer-implemented method of claim 1, further comprising receiving the request to provide the particular virtual function during the runtime.

8. The computer-implemented method of claim 7, further comprising receiving the request to provide the particular virtual function during the runtime from a logical partition.

9. The computer-implemented method of claim 1, further comprising determining during the runtime whether the selected virtual function is associated with another client application.

10. The computer-implemented method of claim 1, further comprising selecting during the runtime a second virtual function that was configured prior to the runtime in response to determining that the parameters of the selected virtual function do not correspond to the requested parameters.

11. The computer-implemented method of claim 10, further comprising:

determining during the runtime whether the parameters of the second virtual function correspond to the requested parameters; and assigning during the runtime the second virtual function to the client application in response to determining that the parameters of the second virtual function correspond to the requested parameters.

12. An apparatus, comprising:

a processor;

a memory to store program code, the program code executable by the processor to determine prior to a runtime a number of virtual functions that each port of a hardware input/output adapter is capable of supporting, to assign prior to the runtime a first portion of internal resources of the hardware input/output adapter to each port of the hardware input/output adapter, to assign prior to the runtime a second portion of the internal resources to each virtual function at each port of the hardware input/output adapter, wherein the second portion of the internal resources is a subset of the first portion of the internal resources, to configure a first virtual function prior to the runtime to use the assigned second portion of the internal resources to enable the first virtual function to be assigned during runtime; to receive a request to provide a particular virtual function, the request specifying one or more requested parameters associated with the particular virtual function; to select during the runtime the first virtual function that was configured prior to the runtime; to determine during the runtime whether parameters of the selected virtual function correspond to the requested parameters; and to assign during the runtime the selected virtual function to a client application in response to determining that the parameters of the selected virtual function correspond to the requested parameters, wherein assigning during the runtime the selected virtual function to the client application comprises associating the selected virtual function with a token that is provided by the client application.

13. The apparatus of claim 12, wherein the internal resources of the hardware input/output adapter include one or more of a plurality of ingress queues, a plurality of egress queues, a plurality of interrupt sources, and a plurality of operating modes.

14. The apparatus of claim 12, wherein the requested parameters include a port identifier.

15. The apparatus of claim 12, wherein the program code is further executable by the processor to select during the runtime a second virtual function that was configured prior to the runtime in response to determining that the parameters of the selected virtual function do not correspond to the requested parameters.

16. The apparatus of claim 15, wherein the program code is further executable by the processor to determine during the runtime whether the parameters of the second virtual function correspond to the requested parameters, and to assign during the runtime the second virtual function to the client application in response to determining that the parameters of the second virtual function correspond to the requested parameters.

17. The apparatus of claim 12, wherein the program code is further executable by the processor to:

allocate the first virtual function at the hardware input/output adapter; and configure the first virtual function during an initial program load.

18. The apparatus of claim 12, wherein the program code is further executable by the processor to configure at least one additional virtual function prior to the runtime.

19. The apparatus of claim 12, wherein the program code is further executable by the processor to receive the request to provide the particular virtual function during the runtime.

20. The apparatus of claim 12, wherein the program code is further executable by the processor to determine during the runtime whether the selected virtual function is associated with another client application.

21. A computer program product comprising a non-transitory computer usable medium having computer usable program code embodied therewith, the computer usable program code executable by a processor to:
- determine prior to a runtime a number of virtual functions that each port of a hardware input/output adapter is capable of supporting;
- assign prior to the runtime a first portion of internal resources of the hardware input/output adapter to each port of the hardware input/output adapter;
- assign prior to the runtime a second portion of the internal resources to each virtual function at each port of the hardware input/output adapter, wherein the second portion of the internal resources is a subset of the first portion of the internal resources;
- configure a first virtual function prior to the runtime to use the assigned second portion of the internal resources to enable the first virtual function to be assigned during runtime;
- receive a request to provide a particular virtual function, the request specifying one or more requested parameters associated with the particular virtual function;
- select during the runtime the first virtual function that was configured prior to the runtime;
- determine during the runtime whether parameters of the selected virtual function correspond to the requested parameters; and
- assign during the runtime the selected virtual function to a client application in response to determining that the parameters of the selected virtual function correspond to the requested parameters, wherein assigning during the runtime the selected virtual function to the client application comprises associating the selected virtual function with a token that is provided by the client application.

* * * * *